UNITED STATES PATENT OFFICE.

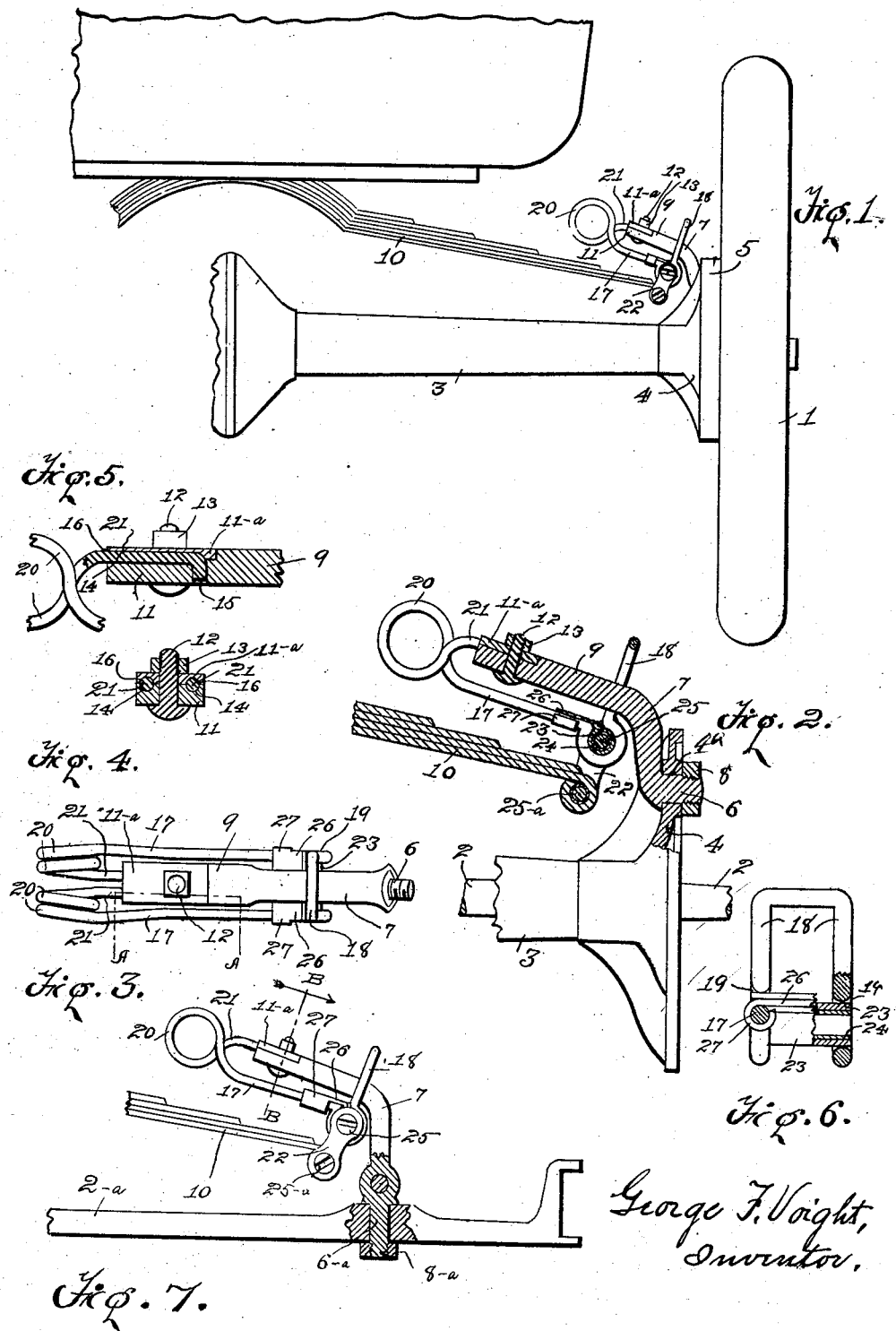

GEORGE F. VOIGHT, OF SAN FRANCISCO, CALIFORNIA.

AUXILIARY SPRING FOR ROAD-VEHICLES.

1,260,488.　　　　　Specification of Letters Patent.　　Patented Mar. 26, 1918.

Application filed March 10, 1917. Serial No. 153,910.

*To all whom it may concern:*

Be it known that I, GEORGE F. VOIGHT, a citizen of the United States, residing at San Francisco, in the county of San Francisco and State of California, have invented a new and useful Improvement in Auxiliary Springs for Road-Vehicles, of which the following is a specification.

My invention relates to improvements in auxiliary springs for road vehicles.

It has for one object to provide a useful and improved form of auxiliary springs which may be placed in series with the principal leaf-spring suspension, and which will coöperate in suspending and cushioning the vehicle. Another object is to provide such an auxiliary spring which may be more flexible and more quickly responsive than is the principal leaf-spring.

With the foregoing and other objects in view which will appear as the description proceeds, the invention resides in the combination and arrangement of parts and in the detail of construction hereinafter described and claimed, it being understood that changes in the precise embodiment of the invention herein disclosed can be made within the scope of what is claimed without departing from the spirit of the invention.

The invention is illustrated in the accompanying drawings, wherein—

Figure 1 is a rear end elevation of the right-hand side of an automobile, including a portion of the automobile body, portion of rear principal leaf-spring, the rear right-hand wheel, a portion of rear axle housing, and a rear side view of the present invention assembled therewith.

Fig. 2 is a rear side sectional view of the invention, and a portion of the rear principal leaf spring, showing also a small portion of the axle housing, a portion of the axle housing flange, and a portion of the axle.

Fig. 3 is a top view of the invention.

Fig. 4 is a sectional end view of a portion of the invention taken on line B—B, Fig. 7.

Fig. 5 is a sectional rear side view of a portion of the present invention taken on line A—A, Fig. 3, portions being broken away.

Fig. 6 is a view of portions of the invention, certain portions being shown in section.

Fig. 7 is a front side elevation of the present invention, showing it applied to the axle of the vehicle.

Like numerals designate like parts throughout the several views and figures.

1 is a rear right-hand wheel of a vehicle, supporting an axle 2 and its housing 3 and housing flange 4. The flange 4 and housing 3 are unitary and non-movable relative to the running gear frame. 5 is a brake drum rigidly secured to the inner side of the wheel 1, and in close relation to the flange 4. Extending through the upper portion of the flange 4, and centrally above the axle 2, is an opening $4^a$. Into the opening $4^a$ is disposed the outer end 6 of a spring hanger 7, which hanger is rigidly secured to said flange 4 by means of a nut 8 threadedly engaging the outer portion of the end 6. The hanger 7 has in inner portion 9, extending inwardly centrally above and approximately in line with the outer portion of the principal leaf spring 10, and also in line with the axle 2 and its housing 3. The inner end of the inner portion 9 of the hanger 7, is rabbeted out at its upper side, forming a reduced portion 11. Upon said reduced portion 11, and fitting into said rabbet, is secured an insert member $11^a$. The insert member $11^a$ is provided with a suitable central opening extending downwardly through from its upper side and registers with a like opening extending down through the reduced portion 11. Into said through the reduced portion 11 openings is disposed a suitable clamping bolt 12, which bolt has a nut 13. Upon the upper side of the reduced portion 11, are cut two arcuated grooves 14, which grooves parallel each other and extend longitudinally with the inner portion 9 a suitable distance and terminate in two downwardly extending openings 15 in said reduced portion 11. Into the lower side of the insert member $11^a$ are cut two grooves 16 registering with the aforesaid grooves, so that when the insert $11^a$ is secured in its position in the rabbet, the grooves 14 will form the lower portions, and the grooves 16 the upper portions, of two cylindrical openings terminating in the aforesaid downwardly extending openings 15. 17 designates the supporting arms, 18 the yoke, 19 the coupling eyes, 20 the coils, and 21 the securing arms, of an auxiliary spring coupled up with one end of the principal leaf spring 10 by means of a connecting shackle 22. (As a matter of convenience in referring to the several sections comprising the auxiliary spring, the securing arms 21 will at times throughout the specification and the claims, be designated as the inner section, the supporting arms 17 as the outer, or outwardly extending, section, and the coils 20 as the intermediate section). The auxiliary spring yieldingly supports one end of the principal leaf spring. The free ends of the securing arms 21 are struck downwardly at right angles with the main portions of the arms and are disposed in the openings 15, while the said main portions of the arms are disposed in the openings formed by the grooves 14 and 16. It is intended that the securing arms 21 shall be rigidly secured to the hanger. Within the eyes 19 is disposed a tie-piece 23 provided with a transverse opening in which is secured a bushing 24, which bushing receives the upper pivot-pin 25 of the shackle 22. 25$^a$ designates the lower pivot-pin of the shackle, and is passed into the eye in the end of the spring 10. The said pivot-pins being rotatable within their respective bearings. The tie-piece 23 is preferably pressed out of a piece of flat steel plate, and is provided with an extension 26 overlying the outer ends of the supporting arms 17 adjacent the eyes 19, and the extension 26 is provided with arcuated tongues 27 encircling the said arms. The functions of the extension 26 and its tongues 27, are to keep the tie-piece 23 from rotating within the eyes 19 and to keep the arms 17 spaced a proper distance apart. The extension 26 also acts in the capacity of a back stop for the upward movement of the arms 17, as when the load upon the auxiliary spring is removed, the normal tension of the auxiliary spring will cause the outer ends of the arms 17 to move upwardly until the extension 26 bears against the under side of the hanger 7. The outer ends of the arms 17 are joined together by the yoke 18, which yoke straddles the hanger from the upper side thereof. I prefer to make the yoke a unit with the arms 17 and the portions forming the eyes 19, however, if desired, it can be made as a separate unit supported in some suitable manner either by the said arms 17, the shackle 22, or by the tie-piece 23. The yoke is intended principally as a down stop for limiting the downward movement of the arms 17, in which case the upper cross section of the yoke engages the upper side of the hanger. The auxiliary spring can be provided with any suitable number of coils 20 to provide the proper flexibility. And if desired, the coils 20 can be eliminated entirely, and the spring made out of a comparatively straight member with its inner end secured to the inner portion of the hanger and its outer end secured to the connecting shackle 22. In Fig. 7 is shown the auxiliary spring and its hanger connected up with the front axle of a vehicle, in which case one end of the hanger 7 is secured in an opening extending vertically through the axle 2$^a$ between the outer end of the principal leaf spring 10 and the end of the axle. The free end of the hanger 7 overhangs the outer end of the spring 2$^a$, and the auxiliary spring is assembled with the inner or free end of the hanger and with the outer end of the principal leaf spring in the same manner as shown and described for the rear axle and the rear principal leaf spring.

The assembled parts designated by the numerals 2, 3 and 4, in Figs. 1 and 2, and the part designated by the numeral 2$^a$ in Fig. 7, I shall refer to in the claims as the axle-assembly.

Throughout the specification, and the claims hereinafter following, inwardly indicates a direction from the wheel to the body of the vehicle, and outwardly indicates a direction opposite to said first mentioned direction, and in connection with the auxiliary spring and the spring hanger, outer portions, outer sections and outer ends indicate portions, sections and ends nearest the vehicle wheel, and inner portions, sections and ends indicate portions, sections and ends farthest from the wheel.

I claim:—

1. The combination with an axle-assembly, a body, a principal leaf spring, a spring hanger, an auxiliary spring, and a pivoted connection between said auxiliary spring and one end of said principal spring; the hanger having its outer end fixedly secured to said axle-assembly and its inner portion over-hanging said principal spring, the auxiliary spring having its inner section fixedly secured to the inner portion of said hanger; of means carried by said auxiliary spring to limit its downward movement, the means embodying a yoke like member straddling the hanger from the upper side thereof and adapted to engage therewith.

2. A spring suspension for road vehicles, comprising an axle-assembly, a principal leaf spring, an auxiliary spring, a pivoted connection between said springs, and a spring hanger, the hanger having its outer end fixedly secured to a portion of the axle-assembly and its inner portion over-hanging the outer end of the principal leaf spring; the auxiliary spring having an inner section rigidly secured to the inner portion of the hanger, an intermediate coiled section and an outwardly extending section extending outwardly below the inner portion of the hanger, the outwardly extending section being provided with means engageable with the upper side of the hanger to limit the downward movement of the said section.

3. A spring suspension for road vehicles, comprising an axle-assembly, a principal transverse leaf spring, an auxiliary spring, a pivoted connection between the outer ends of said springs, and a spring hanger, the hanger having an outer portion rigidly secured to a portion of the axle-assembly and an inner portion extending inwardly a suitable distance and over-hanging the outer end of the principal spring, the auxiliary spring having an inner section rigidly secured to the inner portion of the hanger and an intermediate coiled section and an outwardly extending section, the outwardly extending section having its outer end coupled to one end of said pivoted connection, and means carried by said last mentioned section and adapted to engage a portion of said hanger for limiting the downward movement of said section.

4. A spring suspension for road vehicles, comprising an axle-assembly, a principal transverse leaf spring, an auxiliary spring, a pivoted connection between the outer ends of said springs, and a spring hanger, the hanger having an outer end rigidly secured to a suitable portion of said axle-assembly and an inner portion extending inwardly and a suitable distance and over-hanging the outer end of the principal spring, the auxiliary spring embodying a pair of arms comprising its inner section, a series of vertically disposed coils comprising its intermediate section and a pair of outwardly extending arms comprising its outer section, the last mentioned arms being longer than the first mentioned arms, the said inner section being rigidly secured to the inner portion of the hanger and the outer section being pivotally coupled to the outer end of the principal leaf spring by means of the said pivoted connection, the outer section being provided with means adapted to engage the upper side of the hanger so as to limit the downward movement of the said section.

5. A spring suspension for road vehicles, comprising an axle-assembly, a principal transverse leaf spring, an auxiliary spring, a pivoted connection between the outer ends of said two springs, and a spring hanger, the hanger being rigidly supported by said axle-assembly and being provided with an inwardly extending portion over-hanging the outer end of the principal spring and extending in a general line therewith, the auxiliary spring embodying a pair of relatively short arms comprising its inner section and a series of coils vertically disposed comprising its intermediate section and a pair of relatively long arms comprising its outer section, the said inner section being rigidly secured to the inner portion of the hanger and by which means said hanger supports said auxiliary spring, the outer end of the outer section being coupled to the outer end of said principal leaf spring by means of said pivoted connection, whereby the said outer end of said principal leaf spring is yieldingly supported by said auxiliary spring, the said outer section being provided with a yoke adapted to straddle a portion of said hanger and engageable therewith for limiting the downward movement of the springs.

6. A road vehicle spring suspension comprising an axle-assembly, a principal leaf spring, a spring hanger having a fixed end supported by the axle-assembly and its free end over-hanging the outer end of the principal leaf spring, an auxiliary spring having a fixed end supported by the spring hanger and its free end supporting a pivot pin, a connection between the pivot pin and outer end of the principal leaf spring, and means supported by the free end of the auxiliary spring engageable with the hanger for limiting the downward movement of said free end.

7. A road vehicle spring suspension comprising an axle-assembly, a principal leaf spring, a nonflexible spring hanger having a fixed end rigidly supported by the axle-assembly between the outer end of the axle-assembly and the outer end of the principal leaf spring and its free end over-hanging the outer end of the principal leaf spring, an auxiliary spring having a fixed end supported by the spring hanger and its free end supporting a bearing sleeve, a pivot pin disposed in the bearing sleeve, a connection between the pivot pin and the outer end of the principal leaf spring, and means supported by the free end of the auxiliary spring engageable with the spring hanger to limit the downward movement of said free end.

8. A road vehicle spring suspension comprising an axle-assembly, a principal leaf spring, a non-flexible spring hanger having a fixed end rigidly supported by the axle-assembly between the outer end of the principal leaf spring and the vehicle wheel and its free end over-hanging said outer end of the principal leaf spring, an auxiliary spring having a fixed end supported by the spring hanger adjacent the latter's free end and its free end supporting a bearing provided with a horizontal opening, a pin disposed in said opening, a link connection between the pin and the outer end of the principal leaf spring, and means for limiting the downward movement of the free end of the auxiliary spring, the means embodying a yoke carried by the auxiliary spring adapted for straddling the spring hanger from the upper side thereof.

9. A road vehicle spring suspension comprising an axle-assembly, a principal leaf spring, a spring hanger having a fixed end rigidly supported by the axle-assembly between the outer end of the principal leaf spring and the vehicle wheel and its free end over-hanging the outer end of said principal leaf spring, an auxiliary spring having one end supported by the spring hanger adjacent the latter's free end and its free end disposed below the hanger, a bearing provided with a horizontal opening supported by the free end of the auxiliary spring, a pivot pin disposed in said opening, a link connection between the pivot pin and the outer end of the principal leaf spring, and a yoke engageable with the spring hanger to limit the downward movements of the auxiliary spring, the free ends of the yoke extending below the spring hanger and supported by the auxiliary spring adjacent its free end.

10. A road vehicle spring suspension comprising an axle-assembly, a principal leaf spring, a spring hanger having one end supported by the axle-assembly between the outer end of the principal leaf spring and the vehicle wheel and having a section over-hanging the outer end of the principal leaf spring, an auxiliary spring having a fixed end supported by the spring hanger and an intermediate coiled section and an outwardly extending arm, the arm extending in a general direction with the outer section of the principal leaf spring, a bearing supported by the free or outer end of the arm, the bearing being provided with a horizontal opening, the opening extending transversely relative to the principal leaf spring, a pivot pin disposed in said opening, a pivoted connection between the pivot pin and the outer end of the principal leaf spring, and means associated with said outstanding arm and with the spring hanger adapted for limiting the downward movement of the arm.

11. A road vehicle spring suspension comprising an axle-assembly, a principal leaf spring, a spring hanger having a fixed end supported by the axle-assembly between the outer end of the latter and the outer end of the principal leaf spring and having an inner or free section over-hanging said outer end of the principal leaf spring; an auxiliary spring having a fixed end supported by the inner or free end of the spring hanger and an intermediate coiled section and an arm extending outwardly from said coiled section, the arm being disposed between the spring hanger and the principal leaf spring; a pivoted connection between the free end of the arm and the outer end of the principal leaf spring; and means to limit the downward movement of the arm, the means comprising a yoke adapted to straddle and engage the hanger from the upper side thereof, the free ends of the yoke being secured to the arm of the auxiliary spring.

12. A road vehicle spring suspension comprising an axle-assembly, a spring hanger having one end supported by the axle-assembly and its free end extending inwardly in a direction toward the vehicle body and over-hanging the axle-assembly, an auxiliary spring having a fixed end supported by the spring hanger adjacent the latter's free end and an intermediate coiled section and an arm, the arm under-hanging the spring hanger and extending from the coiled section in a direction toward the vehicle wheel, the free end of the arm supporting a pivot pin, a principal leaf spring disposed above the axle-assembly and having its outer end under-hanging the auxiliary spring, and a link connection between the outer end of the principal leaf spring and the pivot pin; the arrangement being such that the outer end of the principal leaf spring is suspended from underneath the auxiliary spring and yieldingly supported by the latter.

13. A road vehicle spring suspension comprising an axle-assembly, a principal leaf spring over-hanging the axle-assembly and extending in a general direction therewith, a spring hanger having one end supported by the axle-assembly between the outer end of the latter and the outer end of the principal leaf spring, a pair of auxiliary springs disposed side by side relative to each other and having each one end rigidly supported by the free end of the spring hanger and an intermediate coiled section and each an arm extending outwardly toward the vehicle wheel from the coiled sections, means for holding the free ends of the arms a fixed distance apart, means carried by the arms and engageable with the hanger to limit the downward movement of the arms, and a connection between the free ends of the arms and the outer end of the principal leaf spring.

14. A road vehicle spring suspension comprising an axle-assembly, a principal leaf spring over-hanging the axle assembly and extending in a general direction therewith, a spring hanger having one end rigidly supported by the axle-assembly between the outer end of the latter and the outer end of the principal leaf spring and its inner or free end over-hanging the outer end of the principal leaf spring, a plurality of auxiliary springs having each a fixed end supported by the inner or free end of the spring hanger, each of said auxiliary springs having a free end disposed below the hanger, means for holding the free ends of said auxiliary springs in a fixed position relative to each other, means carried by said free ends engageable with the hanger for limiting the downward movements of said free ends, and a pivoted connection between said free ends and the outer end of the principal leaf spring.

15. A spring suspension for road vehicles comprising an axle-assembly, a principal leaf spring disposed above the axle-assembly and extending in a general direction therewith, a spring hanger having one end supported by the axle-assembly between the outer end of the latter and the outer end of the principal spring and its free end extending above the outer end of said spring, an auxiliary spring comprising a flexible coiled section supported by the spring hanger adjacent the latter's free end and an outwardly extending arm having one end supported by the coiled section and its free end supporting a bearing sleeve, a pivot pin disposed in the sleeve, and a link connection between the pivot pin and the outer end of the principal leaf spring, the axis of the coils comprising the coiled section extending in a horizontal direction and transversely relative to the principal leaf spring.

16. A road vehicle spring suspension comprising an axle-assembly, a principal leaf spring disposed above the axle-assembly and extending in a general direction therewith, a spring hanger having one end supported by the axle-assembly between the outer end of the latter and the outer end of said spring and its free end extending above the outer end of said spring, an auxiliary spring comprising a pair of flexible coiled sections and a pair of arms extending outwardly from the coiled sections, the coiled sections and the arms being disposed side by side relative to each other, the coiled sections being supported by the spring hanger adjacent the free end of the latter, the axis of the coils comprising the coiled sections being in alinement with each other and extending in a horizontal direction and transversely relative to the principal leaf spring, the arms extending outwardly from the coils and in a general direction with the outer ends of the principal leaf spring, a pivoted connection between the free ends of the arms and the outer end of the principal leaf spring, the axis of the coils forming in a general way the pivotal axis of one end of the arms and the outer or free ends of the arms are held yieldingly against rotation in one direction by the tension of the coils, the arrangement being such that the auxiliary spring yieldingly supports the outer end of the principal leaf spring.

17. A road vehicle spring suspension comprising an axle-assembly, a principal leaf spring, a spring hanger having a fixed end supported by the axle-assembly between the outer end of the latter and the outer end of the principal leaf spring, an auxiliary spring, the auxiliary spring embodying a coiled section, the axis of the coils forming said coiled section being horizontally disposed, a connection between the coiled section and the free end of the spring hanger, an arm or lever extending outwardly from said coiled section and approximately at right angles with the axis of the coils, the free end of said arm or lever being normally held against rotation about the axis of the coils by the tension of the latter, a link connection between the free end of the arm or lever and the outer end of the principal leaf spring, and means carried by said arm or lever engageable with the spring hanger for limiting the downward movements of said arm or lever.

18. A road vehicle spring suspension comprising an axle-assembly, a principal leaf spring, a spring hanger having a fixed end supported by the axle-assembly, an auxiliary spring embodying a pair of coil units having each an outwardly extending arm or lever, said arms or levers extending approximately at right angles with the axis of the coils, said axis of the coils being horizontally disposed, a connection between the coil units and the spring hanger, said connection being such that said coil units will normally support said arms or levers in outwardly extending positions, said arms or levers being rotatable upon the axis of the coils against the tension of the latter, a pivot pin supported by the free ends of said arms or levers, the axis of said pivot pin being disposed parallel with the axis of the coils, a link connection between the pivot pin and the outer end of the principal leaf spring, and means carried by said arms or levers engageable with said spring hanger for limiting the downward movements of said arms or levers.

19. A road vehicle spring suspension comprising an axle-assembly, a principal leaf spring, a spring hanger, the spring hanger having a fixed end supported by the axle-assembly and its free end overhanging the outer end of the principal leaf spring, an auxiliary spring supported by said spring hanger adjacent its free end, the auxiliary spring comprising a series of flexible coils having a common axis, said axis being horizontally disposed, two of the coils being formed into two outwardly extending arms or levers disposed approximately at right angles to the axis of said coils, said arms or levers being rotatable downwardly about the axis of said coils against the tension of the latter, a link connection between the free ends of said arms or levers and the outer end of the principal leaf spring, and means for limiting the downward movements of said arms or levers.

GEORGE F. VOIGHT.

Copies of this patent may be obtained for five cents each, by addressing the "Commissioner of Patents, Washington, D. C."